United States Patent [19]

Ajero

[11] 4,056,187
[45] Nov. 1, 1977

[54] CORN ORIENTING MACHINERY

[75] Inventor: Fortunato S. Ajero, South Milwaukee, Wis.

[73] Assignee: Carlo S. Ajero, South Milwaukee, Wis.

[21] Appl. No.: 728,351

[22] Filed: Sept. 30, 1976

[51] Int. Cl.² .............................................. B65G 47/24
[52] U.S. Cl. ..................................... 198/394; 193/45; 193/48; 198/40 D; 198/415
[58] Field of Search ............... 198/383, 389, 390, 394, 198/400, 415, 621, 750; 193/48, 45; 221/171, 172

[56] References Cited

U.S. PATENT DOCUMENTS

| 3,463,292 | 8/1969 | Booij et al. | 198/389 |
| 3,487,904 | 1/1970 | Aguilar | 193/43 |
| 3,797,639 | 3/1974 | Smith | 198/394 |
| 3,811,550 | 5/1974 | Ajero | 198/272 |

*Primary Examiner*—Evon C. Blunk
*Assistant Examiner*—Douglas D. Watts
*Attorney, Agent, or Firm*—Wheeler, Morsell, House & Fuller

[57] ABSTRACT

A machine for orienting generally tapered objects such as ears of corn and lining them up on a moving conveyor with their smaller ends uniformly forward, made up of a vertically reciprocating plate with a vertical face, a pressure plate with an opposed face biased toward the face of said vertically reciprocating plate and held in parallel relation thereto, a feed roller with a downward turning generally cylindrical face which feeds tapered objects between said vertically opposed faces, means to supply tapered objects one by one onto said downward turning face, and a conveyor below said pressure plate and vertically reciprocating plate to carry away oriented tapered objects while maintaining their orientation. A tapered object is successively dispensed onto the feed roller, fed thereby between the opposed faces of the reciprocating plate and the pressure plate, pivotally held between such faces at opposed edges of its largest diametral plane, oriented and moved downward in alternate increments by gravity and inertia alternately applied by the vertical motion of the reciprocating plate, and retrieved and carried away with its smaller end foremost.

17 Claims, 3 Drawing Figures

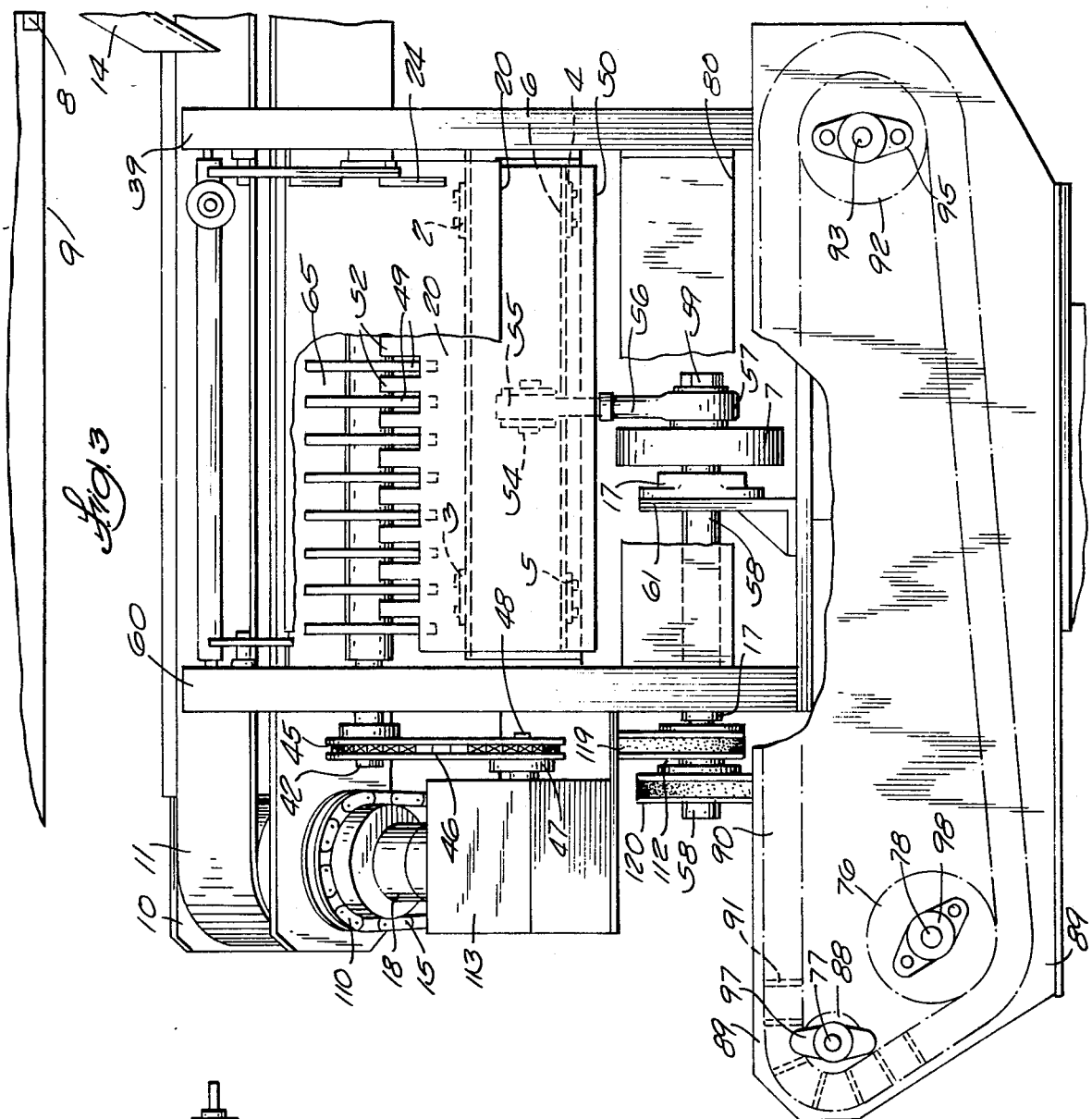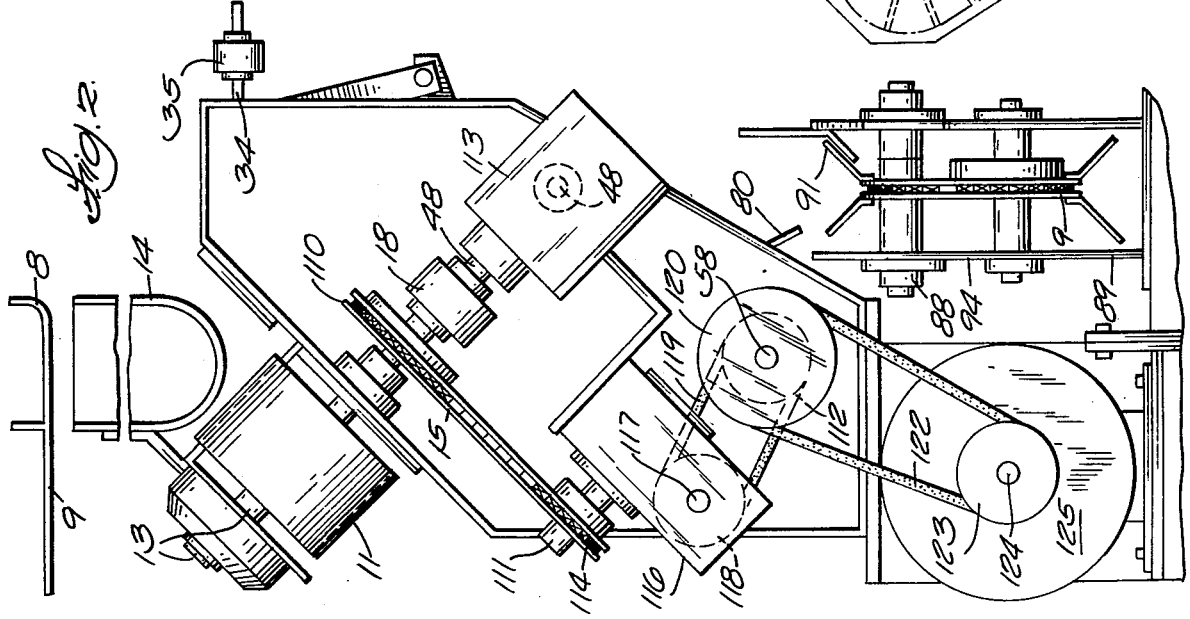

CORN ORIENTING MACHINERY

BACKGROUND OF THE INVENTION

My invention relates to machinery for automatically and uniformly orienting tapered objects of various sorts in order to facilitate further processing of such objects. More particularly, my invention is useful for rapidly orienting husked ears of corn in evenly spaced relation of a conveyor belt with their smaller ends uniformly forward; a single orienter is capable of supplying ordinary kernel removing machinery with oriented ears as rapidly as such machinery is capable of processing them.

DESCRIPTION OF RELATED PRIOR ART

A prior machine for orienting tapered objects, U.S. Pat. No. 3,811,550 reveals a somewhat different mechanism for orienting ears of corn. As will be apparent from the specification and drawings, the prior art device has a different principle of operation than is present in my invention. U.S. Pat. No. 3,811,550 discloses a machine wherein ears of corn are pinched at their largest diametral plane between a downward-turning roller and a hinged traction plate biased into opposition with said roller. While the ear is so pinched, the unaided force of gravity acting on the smaller end of the ear of corn causes the ear to pivot on its largest diametral plane, the smaller end of said ear swinging downward. When the ear emerges below said roller and plate the generally downward-facing smaller end is engaged by a moving conveyor; the larger end of the ear subsequently drops down on the conveyor so that the ear is oriented with its smaller end forward.

Several disadvantages are apparent in the prior art just described. That machine can orient corn no faster than the unaided force of gravity can cause it to pivot. As a result, the prior art orienter is much slower, and it either has to supply the kernel removing machinery with less corn than such machinery is capable of processing, which reduces efficiency, or as evident in said prior art, two corn orienters shown in tandem, have to supply a single kernel cutter, which greatly complicates the related supply set-up for said kernel cutting machinery. This is due to the differing output rates of the two corn orienters which necessitates the need for said supply set-up to have two input means merging into a single output means to supply the oriented ears of corn at a rate matching the cutting capacity of said kernel cutting machinery. This adds to the complexity and cost of corn processing equipment.

Also, the prior art machine orients ears of corn in a single pivoting cycle wherein the ears swing freely due to gravitational acceleration. The disadvantage of this arrangement is that ears of corn frequently overswing, for there is no effective restraint to prevent such ears from swinging back and forth as does a pendulum. As a result of overswing, the orienting operation frequently falls in the prior art unit. This drawback is further increased if orienting speed is doubled to eliminate one of the two corn orienters, shown in tandem in subject prior art.

A further drawback of the corn orienter in U.S. Pat. No. 3,811,550 is apparent when tapered objects having different diameters, such as ears of corn, are supplied to be oriented. The relation between the rotating cylinder and the hinged traction plate of that patent is such that ears of differing largest diameter are held between the plate and cylinder for different lengths of time. The results of this defect are uneven output of oriented ears and occasional failure of the orientation operation when an ear processed for a very short time fails to become properly aligned.

SUMMARY OF THE INVENTION

In my new corn orienter a vetically recirprocating plate and a pressure plate are provided having opposed vertical faces held in parallel relation, said pressure plate being movable back and forth on a parallelogram mounting and biased toward said reciprocating plate.

In operation, a tapered object is fed between said opposed faces by conventional means. The object is pinched on opposing edges of its largest diametral plane by the said opposing faces, which may be provided with ridges or resilient pads to selectively increase the frictional engagement between said opposing faces and the tapered object when the reciprocating face is moving downward with respect to the tapered object. Successive upward stokes of the vertically reciprocating plate transmit upward impulses against the largest diametral plane of the tapered object upward; since the center of gravity of the object lies toward the smaller end of said object with respect to the largest diametral plane thereof, the smaller end incrementally rotates pivotally downward in response to inertia caused by upward acceleration of the object at its pivot point. Successive downward strokes of said reciprocating plate cause said face of the reciprocating plate to advance the object incrementally downward through the machine. The gravitational acceleration working in opposition to inertial forces during the downward stroke tends to prevent adverse rotation of the object at this time. As a result of said alternating upward and downward motion of the reciprocating plate, the tapered object is incrementally oriented with its smaller end downward and advanced downward past the lower extremities of said opposed faces. At the end of the orienting operation, conventional conveyor means receive the oriented ears and convey them to other apparatus for further processing. There is no overswing, due to the incremental application of inertial acceleration.

A further feature of my invention is the provision of a corn orienter having an orienting lane or path of fixed length regardless of the diametral size of objects to be oriented, so that such objects are oriented in a fixed amount of time. The result of this feature is constant spacing between one oriented object and the next on the output conveyor.

Thus, one object of the invention is to provide machinery which uses inertial force to rapidly incrementally orient tapered objects.

Another object of my invention is to provide an orienting machine having several incremental orienting steps, to prevent tapered objects from overswinging during the orienting operation.

Still another object of my invention is to provide an orienting machine with an orienting operation of fixed duration, to maintain output rate to match related kernel cutting machine capacity regardless of variation in the diametral size of objects to be oriented.

Further objects of the invention will be apparent from the specification and drawings.

BRIEF DESCRIPTION OF DRAWINGS

FIG. 2 is a side view of my invention, showing in greater detail the drive mechanism thereof.

FIG. 3 is a cut-away front view of may device.

DETAILED DESCRIPTION OF PREFERRED EMBODIMENT

Figure 1:
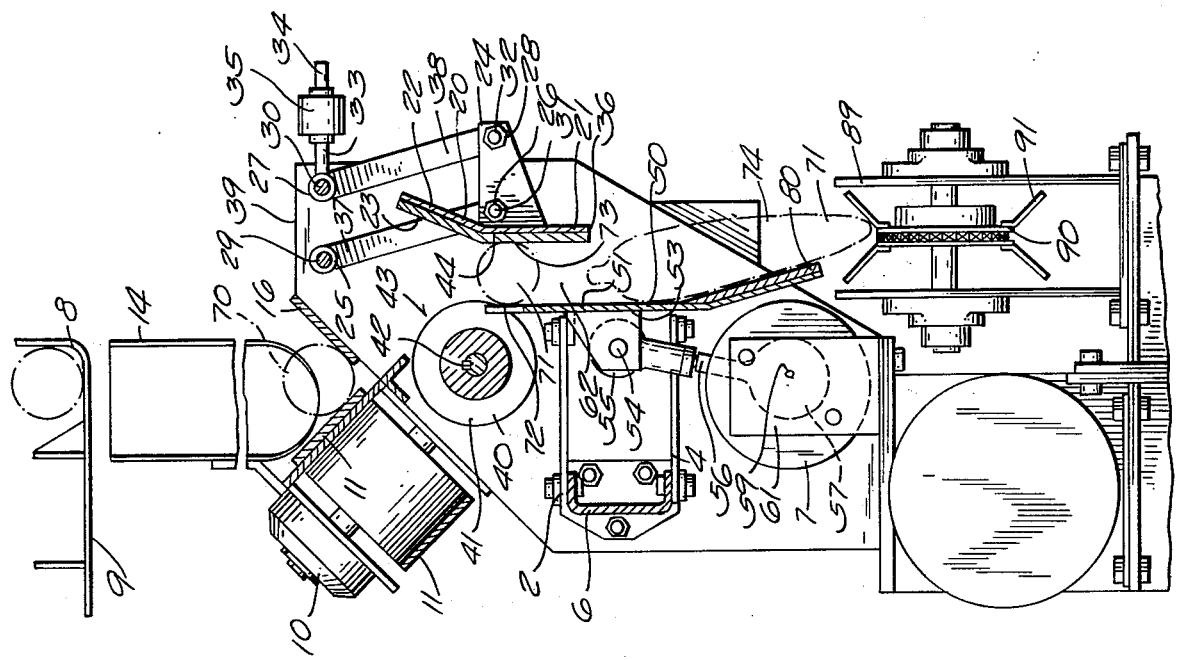
FIG. 1 is a schematic side view of may invention, cutaway to reveal the tapered object orienting mechanism.

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

My corn orienter is generally comprised of input conveyor belt-10, a pressure plate 20, a feed roller 40, a reciprocating plate 50, a guide chute 80 and output conveyor means 89.

Input conveyor belt-10 provided with endless belt-11, is driven by head pully-12 keyed to drive shaft-13 as shown in FIG. 2. Being of conventional design, related components such as tail pulley, idler shaft and bearings are not shown. Head pully-12 is provided with sprocket-110 keyed to driveshaft-13, driven by roller chain-15, which in turn is driven by parts later described. Endless belt-11 and guide plate-16 together form a through as shown in FIG. 1 which receives ears such as 70 and conveys them is spaced longitudinal relation in the direction indicated by arrow-A (as shown in FIG. 3) until ear rolls off by gravity onto feed roller-40 as will be described further herein.

Input conveyor-10 is further provided with a feed chute-14 located at said conveyor's input end as shown in FIGS. 1 and 2, and partially shown in FIG. 3. Said feed chute provides a transfer means for randomly oriented ears between output slot-8 of conventional vibrating supply conveyor pan-9 and said input conveyor-10.

Pressure plate 20 has a backing plate 21 which is constructed of rigid material. Backing plate 21 preferably has a steeply inclined upper end 22 to guide ears into proper alignment for the orienting phase of my device. Backing plate 21 is provided with identical L.H. and R.H. outward horizontal extensions 24 to each of which, lower ends 26 of L.H. and R.H. inward parallel bars 37, and lower ends 28 of L.H. and R.H. outward parallel bars 38 are pivotally attached. Corresponding upper ends of 25 of said L.H. and R.H. inward parallel bars 37 and upper ends 27 of L.H. and R.H. outward parallel bars 38 are pivotally attached to L.H. and R.H. vertical support panels 60 and 39 respectively. Pivotal axes 29, 30, 31 and 32 form the corners of one set of two parallelograms, the R.H. set of which is shown in FIG. 1. As a result, inward and outward travel of pressure plate 20 is possible, yet its backing plate 21 always remains parallel to a single plane. Outwardly extending arm 33, (and a weight 35,) having an outer extremity 34, provides an adjustable clockwise torque about axis 30 which is transferred to the L.H. and R.H. parallel bars 38, thence to outward horizontal extensions 24, thence to backing plate 21 to bias said plate inwards while accommodating ears such as 71 having various diameters.

The inward face 23 of backing plate 21 is adapted to contact an ear such as 71 in frictional engagement. Inward face 23 may be made of resilient high-friction material. Alternatively, it may be provided with downward-pointing ridges 100 which tend to allow an ear such as 71 to slide downward more easily than they allow upward travel of said ear. Such ridge design aids the downward travel of ear 71 through the orienter. In either case, inward face 23 is adapted to engage ear 71 at one edge 73 of its largest diametral plane. (The largest diametral plane is defined as the plane segment of a generally tapered object which forms the largest cross-section perpendicular to the long axis of said object).

Horizontally-disposed feed roller 40 has a shaft 42 driven by sprocket 45, which in turn is driven by parts later described. Roller 40 is cylindrical in this embodiment and has numerous spaced concentric flanges, one of which is indicated in FIG. 3 by the number 49, extending radially outward to define a generally cylidrical outer face 41, interrupted by spaces such as 65 on FIG. 3.

Roller 40 has a downward turning segment 43 of outer face 41 which is adapted to receive ears as they roll off from input conveyor 10 and to transport the ears until they reach the position of ear 71, which is located with edge 72 of its largest diametral plane at the intersection between downward-turning segment 43 and upper edge 52 of reciprocating plate 50 at point 44. Reciprocating plate 50, as shown in FIG. 1 is mounted on two (upper) flat spring -2 and -3 and two (lower) flat springs -4 and -5. Said springs are in turn anchored at their free ends, to support bracket -6, horizontally disposed as shown, within the confines of the R.H. and L.H. vertical support panels-39 and 60 respectively. Said reciprocating plate's upper edge-52 is also provided with notches-67, which are adapted to receive flange 49 so that part of notched upper edge 52 always lies radially within downward-turning segment 43 of cylindrical outer face 41, despite the vertical movement of reciprocating plate 50. Plate 50 further has an ear-engaging inward face 51 which is parallel to inward face 23 of pressure plate 20 and lies in opposed relation thereto. As with face 23, face 51 is provided with resilient or ridged means to frictionally engage selectively an ear such as 71 at the edge 72 of its largest diametral plane, preferably constructed as shown in FIG. 4 with downward-facing ridges 101 which resist substantial upward motion of an ear such as 71 with respect to inward face 51. Plate 50 has a center clevis member 53 to which upper portion 55 of connecting rod 56 is pivotally attached by pivot 54. Connecting rod 56 has an upper portion 55 and a lower portion 57 connected so that the length of such connecting rod can be adjusted when it is initially installed. The lower end 57 of connecting rod 56 is pivotally secured to eccentric crank pin 59 of rotating shaft 58, said shaft 58, provided with integral flywheel-7 is supported by bearings-17 mounted on vertical support panel -60 and mounting plate 61, and driven by further drive means later described. As a result of the rotation of shaft 58, eccentric motion of crank pin 59 is translated into substantially longitudinal motion of connecting rod 56 and the upper end 55 thereof causes center clevis motion 53 to reciprocate up and down, which in turn results in vertical reciprocal motion of inward face 51 of plate 50. The space between opposed parallel plates 20 and 50, bounded at its upper extremity by point 44 and at its lower extremity by bottom edge 36 of pressure plate 20, forms orienting lane 62.

Guide chute 80, disposed generally below reciprocating plate 50, receives ears such as 74 that emerge from orienting lane 62 and guides them onto output conveyor means 89.

Output conveyor means-89 includes an endless conveyor chain-90, with closely spaced V-shaped lugs-91. Said conveyor chain is carried on rear idler sprocket-92, front idler sprocket-88 and drives sprocket-76 shown in FIGS. 2 and 3. Said sprockets are mounted on respective shafts-93, 77, and 78 supported by complementary bearings-95, 97 and 98, mounted on conveyor frame-94. The conveyor chain's V-shaped lugs-91 are adapted to receive oriented ears such as-74, the smaller ends thereof foremost, retaining their orientation and carrying them in proper spaced relation to further processing machinery. Said output conveyor-89 is a component of the kernel removing machinery and is further driven by same.

FIGS. 2 and 3 show the details of the means used to drive the various parts of my corn orienter. Belt 11 of the input conveyor belt is driven by head pulley 12, which in turn is driven by shaft 13. Sprocket 110 on shaft 13 is driven by sprocket 114 via roller chain 15. Shaft 111, which drives sprocket 114, is connected via worm gear speed reducer 116 to shaft 117 carrying pulley 118. Belt 119 connects pulley 118 to inner pulley 112. Inner pulley 112 and other pulley 120 are mounted in tandem on shaft 58 which drives the oscillating plate and associated mechanism; outer pulley 120 is driven by belt 122 and pulley 123; shaft 124 of pulley 123 is rotated by electric motor 125. Right angle speed reducer 113 is driven by head pulley shaft 13 thru coupling-18 and in turn drives reducer input shaft 48. Sprocket 47 and 45, connected by chain 46, drive shaft 42 on which feed roller 40 is mounted.

During the operation of the corn orienter, an ear of corn is driven along guide plate 16 by belt 11 until said ear reaches the end of guide plate 16, at which point it rolls off of belt 11 and onto downward-turning segment 43 of feed roller 40. The ear continues to roll on its own until it is pinched between feed roller flanges 49 and pressure plate upper end 22 - the motion of said downward-turning segment 43 then feeds the ear into the space occupied by ear 71 of FIG. 1 at the point 44 where feed roller flanges 49 pass through the notched upper edge 52 of reciprocating plate 50. At this point the ear has a generally normal orientation of its longituidnal axis (perpendicular to both the left-right, or horizontal direction and the vertical directions of FIG. 1).

The ear then becomes pinched by opposing inward faces 51 and 23 at the opposing edges 72 and 73 of its largest diametral plane. In response to upward motion of reciprocating plate 50 transmitted through inward face 51 to the largest diametral plane of an ear, the largest plane is given an upward impulse, while due to inertia the free smaller end of the ear pivots downward around a diameter of the ear defined by edges 72 and 73 of the largest diametral plane. During the downward stroke of plate 50 little orientation occurs because gravity accelerates all parts of the ear as the plate 50 moves. At the next upstroke the corn ear does not accelerate as fast as the plate but frictionally receives an upward impulse as before. Where reciprocating plate 50 is supplied with downward pointing horizontal ridges 101 such ridges tend to allow downward slippage of the ear with respect to reciprocating plate while the downward facing ridges 100 on the pressure plate engage tightly against the ear at edge 73 to prevent the ear from moving upward with respect to pressure plate 20 during the upward stroke of reciprocating plate 50. As a result of this upward stroke, the ear is oriented with its smaller end more nearly downward, and it advances downward somewhat with respect to inward face 51. In response to the downward stroke, the horizontal ridges 100 tend to disengage, allowing the ear to slide downward with respect to inward face 23. On the other hand, the horizontal ridges 101 tend to engage during the downward stroke, to prevent upward travel of the ear, so the ear is advanced incrementally downward in response to the downward motion of reciprocating plate 50.

Each ear is subjected to several alternations of upward and downward reciprocal motion of plate 50 - on each upward stroke a strong inertial force combined with gravity urges the ear into better orientation, and on each downward stroke the ear is advanced downward through the mechanism, with opposing inertial and gravitational forces tending to cancel each other, reducing the net force. When the ear advances so far downward that its largest diametral plane lies below the bottom edge 36, of pressure plate 20, the now-oriented ear slides downward along guide chute 80 until its smaller end is engaged by the moving path of output conveyor chain 90. The motion of such conveyor pulls the smaller end of the ear forward so that the butt of the ear will fall backward onto output conveyor chain 90. In practice, the corn orienter processes every ear in the same amount of time regardless of its diameter so the ears end up uniformly spaced on output conveyor chain 90.

The following specifications have proven satisfactory in the operation of my corn orienter, although they in no way limit the scope of the invention:
  crankpin speed — 1,232 RPM
  connecting rod stroke — 0.50 inches
  length of orienting lane — 2.50 inches
  feed roller outer face speed — 1078 inches per minute
  machine capacity — 125 ears per minute It is to be understood that the scope of this invention goes beyond the above description of the preferred embodiment. For example, the machine is adaptable to orient generally frustoconical objects of any description; the reciprocating plate can be replaced by a fixed plate backing a reciprocating endless belt, the upper portion of which acts as the equivalent of my feed roller; and so forth. In addition, the application of inertia to the tapered object whereby to effect orientation thereof can be accomplished by providing an analog of the vertical reciprocating plate which moves in one direction only, such as an endless belt, such analog being provided with braking means which allow its motion to repeatedly be abruptly slowed down. Such interruptions would take the place of successive upward strokes of the reciprocating plate described above.

I claim:

1. A machine for inertially orienting generally tapered cylindrical articles having a larger end, a smaller end, and a largest diametral plane comprising:
   A. A feed means with a normal axis and a generally cylindrical outer face;
   B. Means to periodically feed individual randomly oriented tapered objects onto the downward-turning portion of the outer face of the feed means;

C. A vertically reciprocating plate aligned generally below the downward-turning portion of the feed roller, having a nearly vertical inward face.

D. A pressure plate, having an inward face in variably-spaced opposed parallel relation to the inward face of the reciprocating plate, and biased toward said reciprocating plate; and E. Conveyor means to retrieve and carry away said tapered articles in spaced relation, oriented with their smaller ends foremost;

Whereby tapered articles are successively fed onto the feed means, fed thereby between said opposed inward faces, pivotally held between said faces at opposed edges of its largest diametral plane, alternately oriented and moved downward in increments by inertia and by gravity respectively applied by the vertical motions of the reciprocating plate, said articles being retrieved and carried away with their smaller ends foremost, successive tapered objects being evenly spaced as they are carried away.

2. The device of claim 1 in which the feed means is a roller and further comprising a plurality of spaced concentric flanges disposed on the feed roller outwardly of its generally cylindrical outer edge and a plurality of notches in the upper edge of the reciprocating plate adapted to receive the feed roller flanges whereby said plate is smoothly tangent to the roller in all reciprocating positions.

3. The device of claim 1 said plate further comprising a plurality of horizontal ridges disposed on the inward face of said reciprocating plate and adapted to engage an edge of the largest diametral plane of a tapered object during the downward stroke of the reciprocating plate, whereby said object is advanced downwardly along the pressure plate during said downward stroke.

4. The device of claim 3, wherein each said ridge has upper and lower faces lying generally in an oblique normal plane, the upper face having a longer vertical dimension than the lower face.

5. The device of claim 1, further comprising a plurality of normally-disposed ridges on the inward face of said pressure plate adapted to engage an edge of the largest diametral plane of a tapered object whereby to prevent upward motion of said object between said inward opposed faces during the upward stroke of the reciprocating plate.

6. The device of claim 5, wherein each said normally-disposed ridge has upper and lower faces lying generally an oblique normal plane, the upper face having a longer vertical dimension than the lower face.

7. The device of claim 1, further comprising a pressure-plate mounting having substantially vertical inward and outward parallel bars, pivotally mounted at their lower ends to an outward horizontal extension of said pressure plate, such bars pivotally mounted at their upper ends to a horizontal fixed member, said pivotal mountings defining the four corners of a parallelogram, whereby the inward face of the pressure plate is held parallel to the inward face of the reciprocating plate when said pressure plate moves inward or outward.

8. The device of claim 7, wherein a substantially horizontally disposed weighted arm attached to the outward parallel bear near the upper pivot thereof, and extending outwardly therefrom, pivotally biases the lower edge of said outward parallel arm inward, and biases the pressure plate inwardly toward the reciprocating plate.

9. The device of claim 8, wherein the weighted arm carries a separate weight mounted for adjustment inward or outward along the arm to respectively decrease or increase the torque about the upper pivot of the outward parallel bar, thus adjusting the degree of inward bias exerted on the pressure plate.

10. The device of claim 1, wherein said vertically reciprocating plate has a backing plate pivotally mounted to the upper end of a substantially vertical connecting rod, the lower end of which is pivotally mounted to an eccentric crank, which in turn is driven by a rotating shaft, whereby the eccentric motion of the crank is translated by the connecting rod into vertical reciprocating motion of the reciprocating plate.

11. The device of claim 1 wherein a plurality of ganged orientation machines have unitary feed means and a unitary reciprocating plate.

12. A method to orient generally tapered objects having a largest diametral plane, comprised of the following steps:

A. Causing a tapered object to be placed between first and second generally parallel surfaces, said first surface being capable of vertical reciprocating motion and said second surface being biased toward said first surface;

B. Bringing said second surface toward said first surface to engage said tapered object on opposed edges of its largest diametral plane in such fashion that the object is pivotally mounted with its pivotal axis in substantially horizontal alignment.

C. Moving said first surface vertically upward to allow combined gravitational and inertial torque on the free smaller end of said object to force such smaller end to become oriented more neearly downward.

D. Moving said first surface vertically downward to advance the object downward between said first and second surfaces;

E. Repeating the above steps C and D unitl orientation is complete and the opposed edges of said largest diametral plane have advanced downward below the lower edges of said first and second surfaces.

13. The method of claim 12, further comprising the final step of providing automatic conveyor means to receive and carry away oriented tapered objects in evenly spaced successive relation, with their respective smaller ends foremost.

14. The method of claim 12, further comprising provision of an automated feed system to periodically place a tapered object between said first and second parallel surfaces.

15. A tapered object orienting machine adapted to orient tapered objects with their smaller ends foremost, of the type having first and second inwardly opposed orienting surfaces biased toward each other, between which surfaces a tapered object is engaged on opposite edges of its largest diametral plane in an orienting operation, wherein the improvement comprises an orienting lane of fixed length bounded by said opposed orienting surfaces, having a first fixed point where an object to be oriented is engaged at the edges of its largest diametral plane and a second fixed point where such engagement is released at the end of the orienting operation, said first and second fixed points being constant when tapered objects having different largest diameters are oriented in said machine, and means to intermittently apply an upward force to objects in said lane whereby to orient said objects without overcorrection.

16. The machine of claim 15, wherein said first and second orienting surfaces are substantially vertical plates, said second orienting surface is biased toward said first surface and is provided with mounting means allowing movement toward or away from said first orienting surface in parallel relation thereto, and said first and second orienting surfaces are supplied with tapered objects at the said first fixed point by a moving feed surface, wherein the portion of said feed surface immediately adjacent said first fixed point is positioned above said orienting lane and the feed surface intersects with the upper extremity of the said first orienting surface, whereby a tapered object to be oriented first is supplied onto said feed surface, then is fed at a fixed rate into contact with the upper end of said second orienting surface, then is moved along said second orienting surface by the motion of said feed surface until the largest diametral plane of the tapered object reaches the first fixed point of said orienting lane.

17. A tapered object orienting machine adapted to orient tapered objects with their smaller ends foremost, of the type having first and second inwardly opposed orienting surfaces biased toward each other, between which surfaces a tapered object is engaged on opposite edges of its largest diametral plane in an orienting operation, wherein the improvement comprises an orienting lane of fixed length bonded by said opposed orienting surfaces, have a first fixed point where an object to be oriented is engaged at the edges of its largest diametral plane and a second fixed point where such engagement is released at the end of the orienting operation, said first and second fixed points being constant when tapered objects having different largest diameters are oriented in said machine, and means to intermittently apply an upward force to objects in said lane whereby to orient said objects without overcorrection, said first and second orienting surfaces being substantially vertical plates, said second orienting surface being biased toward said first surface and provided with mounting means allowing movement toward or away from said first orienting surface in parallel relation thereto, and said first and second orienting surfaces being supplied with tapered objects at the said first fixed point by a moving feed surface, the portion of said feed surface immediately adjacent said first fixed point being positioned above said orienting lane and the feed surface intersecting with the upper extremity of the said first orienting surface, whereby a tapered object to be oriented first is supplied onto said feed surface, then is fed at a fixed rate into contact with the upper end of said second orienting surface, then is moved along said second orienting surface by the motion of said feed surface until the largest diametral plane of the tapered object reaches the first fixed point of said orienting lane, and wherein said feed surface comprises a plurality of laterally spaced narrow elements extending in the direction of movement of the feed surface, and said first orienting surface is a generally vertically reciprocating plate having portions occupying the spaces between the laterally spaced elements of the feed surface at least at its upper edge, whereby the feed surface intersects with and passes through the upper edge of the first orienting surface at all stages of the vertical reciprocation of the first orienting surface, said point of intersection defining the first fixed point.

* * * * *